(12) United States Patent
Lange et al.

(10) Patent No.: US 10,305,336 B2
(45) Date of Patent: May 28, 2019

(54) AIRCRAFT COMPRISING A SYNCHRONOUS RELUCTANCE MACHINE

(71) Applicant: Liebherr-Aerospace Lindenberg GmbH, Lindenberg (DE)

(72) Inventors: Tobias Lange, Aachen (DE); Rik W. De Doncker, Leuven (BE)

(73) Assignee: Liebherr-Aerospace Lindenberg GmbH, Lindenberg (DE)

( * ) Notice: Subject to any disclaimer, the term of this patent is extended or adjusted under 35 U.S.C. 154(b) by 135 days.

(21) Appl. No.: 14/894,321

(22) PCT Filed: Jan. 29, 2015

(86) PCT No.: PCT/EP2015/000173
§ 371 (c)(1),
(2) Date: Nov. 25, 2015

(87) PCT Pub. No.: WO2015/120959
PCT Pub. Date: Aug. 20, 2015

(65) Prior Publication Data
US 2016/0352161 A1    Dec. 1, 2016

(30) Foreign Application Priority Data

Feb. 11, 2014  (DE) .................... 10 2014 001 855
Sep. 25, 2014  (DE) .................... 10 2014 014 487

(51) Int. Cl.
*H02K 37/00*   (2006.01)
*H02K 1/24*    (2006.01)
*H02K 1/27*    (2006.01)
*B64C 13/50*   (2006.01)

(52) U.S. Cl.
CPC ............. *H02K 1/246* (2013.01); *B64C 13/50* (2013.01); *H02K 1/2766* (2013.01); *H02K 2213/03* (2013.01)

(58) Field of Classification Search
CPC .. H02K 1/246; H02K 1/2766; H02K 2213/03; B64C 13/50
USPC ........................................................ 310/46
See application file for complete search history.

(56) References Cited

U.S. PATENT DOCUMENTS

| 6,218,753 B1 | 4/2001 | Asano et al. |
| 7,105,971 B2 | 9/2006 | Asai et al. |
| 7,932,658 B2 | 4/2011 | Ionel |
| 8,089,190 B2 | 1/2012 | Lee et al. |

(Continued)

FOREIGN PATENT DOCUMENTS

| DE | 19933009 A1 | 2/2000 |
| DE | 10316831 A1 | 11/2003 |

(Continued)

OTHER PUBLICATIONS

ISA European Patent Office, International Search Report Issued in Application No. PCT/EP2015/000173, dated Jul. 10, 2015, WIPO, 6 pages.

*Primary Examiner* — Jianchun Qin
(74) *Attorney, Agent, or Firm* — McCoy Russell LLP

(57) ABSTRACT

The present invention relates to an aircraft with at least one synchronous reluctance machine which comprises a stator with a plurality of grooves and teeth and a rotor with a plurality of magnetic flux barriers, wherein at least one magnetic flux barrier is designed asymmetrical to the q-axis.

17 Claims, 2 Drawing Sheets

(56) References Cited

U.S. PATENT DOCUMENTS

| | | | |
|---|---|---|---|
| 8,227,952 B2 | 7/2012 | Shichijoh et al. | |
| 9,831,729 B2 * | 11/2017 | Kim | H02K 1/276 |
| 2003/0111927 A1 * | 6/2003 | Takita | H02K 1/246 |
| | | | 310/261.1 |

FOREIGN PATENT DOCUMENTS

| | | |
|---|---|---|
| DE | 102008057391 A1 | 5/2009 |
| DE | 102012101822 A1 | 10/2013 |
| EP | 1835620 A1 | 9/2007 |
| GB | 2444838 A | 6/2008 |
| JP | 2001258222 A | 9/2001 |
| JP | 2011223742 A | 11/2011 |
| WO | 2013131795 A2 | 9/2013 |

\* cited by examiner

AIRCRAFT COMPRISING A SYNCHRONOUS RELUCTANCE MACHINE

CROSS REFERENCE TO RELATED APPLICATIONS

The present application is a U.S. National Phase of International Patent Application Serial No. PCT/EP2015/000173, entitled "Aircraft Comprising a Synchronous Reluctance Machine," filed on Jan. 29, 2015, which claims priority to German Patent Application No. 10 2014 014 487.9, filed on Sep. 25, 2014, and to German Patent Application No. 10 2014 001 855.5, filed Feb. 11, 2014, the entire contents of each of which are hereby incorporated by reference in their entirety for all purposes.

TECHNICAL FIELD

This invention relates to an aircraft with at least one synchronous reluctance machine comprising a stator with a plurality of grooves and teeth and a rotor with a plurality of magnetic flux barriers.

BACKGROUND AND SUMMARY

Electric motors are used for controlling or actuating specific components of an aircraft. For example, such motors are suitable for controlling the air buoyancy flaps of an airplane, but there are numerous further applications within an aircraft.

As possible types of motor synchronous reluctance machines are used, whose torque is generated on the basis of the reluctance force, for this purpose, the rotor cross-section is divided into so-called flux guiding and flux blocking portions, which are characterized by different magnetic resistances. The rotor itself generally is made of conductive sheet metal, in particular fabricated of a sheet package to avoid turbulent streams, wherein the lamination geometry of the individual laminations each is provided with flux guiding and flux blocking portions.

In the preferred magnetic direction (d-direction), a lower magnetic resistance occurs and the magnetic flux is guided well in the iron. In q-direction, the magnetic flux barriers impede the magnetic flux. Due to the overlap of rotor teeth and rotor barriers with stator teeth and grooves, a torque ripple occurs in such types of motor, when the rotor is rotated. This torque ripple can lead to undesired vibrations and to an increased noise emission, which is to be avoided in particular in applications of aircraft engineering.

A reduction of the torque ripple so far has been achieved by three known methods. On the one hand, it has been attempted to tackle the problem with the machine slope also known from other machine types such as asynchronous and synchronous machines. This procedure, however, requires an increased manufacturing expenditure, as the individual sheet packages of the machine portions must be positioned on the shaft very accurately. The angular offset between the individual portions determines the future torque ripple of the machine.

Alternatively, a combination of two different rotor geometries is taken into consideration. Here, two or more different barrier configurations of the rotor are combined on one shaft, in order to smooth the resulting torque by means of superposition of the barrier configurations. An example for the combination of different rotor cross-section geometries from different barrier configurations is given in FIG. 1. The geometries R-type and J-type were combined to a novel geometry. The resulting rotor has a total of four flux blocking portions with a barrier configuration, wherein the opposed barrier configurations are designed identical and the adjacent configurations are designed different.

Furthermore, there are rotor structures which by the position of the rotor tooth relative to the stator tooth reduce the ripple of the torque. The known geometries, however, are not constructed point-symmetrical with respect to the axis of rotation, which in motor operation can lead to imbalance and vibrations of the machine. To master these problems, individual laminations of the sheet package therefore must be rotated against each other on the shaft, in order to compensate the imbalance and vibrations. In this solution, however, it is disadvantageous that the resulting imbalance and vibration of the machine only can be compensated by an expensive rotation of the individual rotor sheets relative to each other. The angle of the rotation is to be determined by expensive methods, which renders the entire construction and the manufacturing method of the rotor very expensive.

This fact has a particularly disadvantageous effect on the use within an aircraft, as the motor vibrations can have a substantial influence on the flight safety of the aircraft and therefore should rather be avoided. However, the manufacturing method and the application of such synchronous reluctance machines within an aircraft also should be simplified.

The object of the present invention consists in indicating an aircraft with a synchronous reluctance machine, wherein the rotor is characterized by an optimized cross-sectional geometry which in an efficient way knows to avoid the torque ripple and the resulting vibration of the machine.

This object is solved by an aircraft with at least one synchronous reluctance machine comprising a stator with a plurality of grooves and teeth and a rotor with a plurality of magnetic flux barriers. Additional advantageous aspects of the aircraft are also described.

As compared to the known rotor cross-section geometries, the rotor according to the invention now is characterized in that at least one magnetic flux barrier is designed asymmetrical to the q-axis. The average of the magnetic reluctance hence constantly acts independent of the position of the rotor, so that the torque ripple is reduced. The motor hence can be operated in a stable way. In contrast to the prior art, the rotor however captivates by a simple structure of the lamination geometry and the composition on the rotor shaft. The production thereby is simplified and the manufacturing costs can be reduced systematically.

In rotor structures which consist of at least two segments, the ripple solely is reduced by their superposition, in case at least one flux barrier is formed asymmetrical.

In an aircraft, synchronous reluctance machines expediently are used for applications with a power class equal to or below 5 kW, as in such power classes the same are characterized by a particularly efficient mode of operation.

As a typical application profile of synchronous reluctance motors within an aircraft redundant drives, keyword "torque summing", are conceivable, as in the case of possible motor faults of one side, in particular in the motor winding, no undesired consequences such as short circuits, drag torques, inductions, etc. will occur.

General key applications in principle are to be found in all electric actuators of an aircraft, in particular in electromechanical drives of the flight control, and in the landing gear actuation and steering system, or also for controlling a high-lift system of an aircraft.

It is preferred particularly, when due to the asymmetrical design at least one flux barrier is obtained independent of the rotor position, such that one flux barrier end of the at least one flux barrier substantially is opposed to a stator groove of the stator and the opposite end of the flux barrier substantially is opposed to a stator tooth. Particularly preferably, at least one end completely is opposed to a stator groove and the opposite end completely is opposed to a stator tooth. Mostly, however, the barrier end is located close to a groove or toothing.

In a preferred aspect of the invention, the stator includes a plurality of regularly spaced grooves and teeth.

An asymmetric design of the at least one flux barrier in particular is achieved in that the flux barrier angles of at least one magnetic flux barrier are chosen unequal. This means that for example one end of the magnetic flux barrier is inclined in direction of the q-axis and the opposite end is remote from the q-axis, i.e. inclined further in direction of the d-axis. Proceeding from a symmetric reference angle for both barrier ends, the angle on the one hand is increased and for the opposed barrier end the angle is reduced. The consequence is that independent of the rotor position the barrier ends each approximately oppose a stator tooth and on the other hand oppose a stator groove.

Ideally, the variation ranges of the flux barrier angles of at least one magnetic flux barrier are defined by the following equations:

$$\Delta\theta_{Stator} = \frac{360°}{N_{stator\ groove}} \quad (1)$$

$$\theta_{1,max} = \theta_{sym} + \Delta\theta_{Stator} \quad (2)$$

$$\theta_{2,min} = \theta_{sym} - \Delta\theta_{Stator} \quad (3)$$

$$\Delta\theta_{Stator} \geq \frac{|\theta_1 - \theta_2|}{2} \quad (4)$$

wherein $\theta_{1,max/2,min}$ represents the limit values for the unequal flux barrier angles, $\theta_{sym}$ represents the symmetric reference angle, preferably 135° for a 4-pole rotor, and $\Delta\theta_{Stator}$ represents the groove pitch of the stator.

From these equations it follows that the procedure for reducing the torque ripple according to the invention is independent of the pole pair number and the flux barrier number or the stator groove number of the reluctance machine of the aircraft.

An effective adaptation of the average reluctance of the rotor ideally is achieved in that at least the innermost magnetic flux barrier of a rotor gap is designed asymmetrical. Innermost flux barrier is understood to be that barrier which per magnetic flux blocking portion is closest to the rotor center and therefore has the largest opening angle. The end points of these barriers preferably with the one end point on the stator side cover or overlap a groove opening and with the other end point cover or overlap a stator tooth.

Ideally, all flux barriers of a rotor gap, i.e. of a flux blocking portion, are designed asymmetrical, wherein identical or unequal angles can be used for the different flux barriers. Expediently, all flux barriers of the rotor cross-section are asymmetrical. Ideally, the inner and outer flux barriers are parallel to each other, whereby the magnetic flux and the saturation behavior of the rotor can be kept almost constant.

In a particularly preferred aspect, the rotor cross-section is point-symmetrical to the axis of rotation, i.e. the flux blocking portions are point-symmetrical to the axis of rotation. Due to the point symmetry, the imbalance and vibration known from the prior art can be avoided a priori and a complicated arrangement or rotation of the sheets on the rotor shaft can be omitted in principle.

For the further reduction of the torque ripple it is expedient when the rotor is divided into one or more segments in axial direction, wherein a part of the rotor segments is mounted on the rotor shaft folded about the Z-axis, in particular folded about the Z-axis by 180°. Particularly preferably, the entire rotor construction consists of identically constructed laminations, wherein a part of the laminations is combined to various segments and the respective segments are arranged on the rotor shaft folded to each other by 180°.

By applying the sheet packages onto the rotor shaft, the resulting overall torque is superimposed, but the ripple of the torque is cancelled out by the phase shift. Due to the unequal and asymmetrical design of the at least one flux barrier, the mean torque however remains almost unchanged. Changes in the range of <5% are tolerable. Particularly preferably, the flux barrier angle is chosen such that a phase shift of the stator groove harmonic and possible of higher harmonics in the individual segments by about 180° is achieved.

Further advantages and properties of the invention will be explained in detail below with reference to an exemplary embodiment illustrated in the figures.

DETAILED DESCRIPTION

In the following, the construction of the synchronous reluctance motor according to the invention will be set forth in detail, as it is used in an aircraft according to the present invention. The synchronous reluctance motor for example serves for controlling the flap kinematics of an airplane. In particular, the use of the motor in the electric PCU is to be considered, which represents the central drive unit of a high-lift system. However, other key applications also are conceivable, in particular for all electric actuators of the aircraft, such as for example electromechanical drives of the flight control as well as of the landing gear actuation (refraction and extension) or the steering system.

Figure 1:
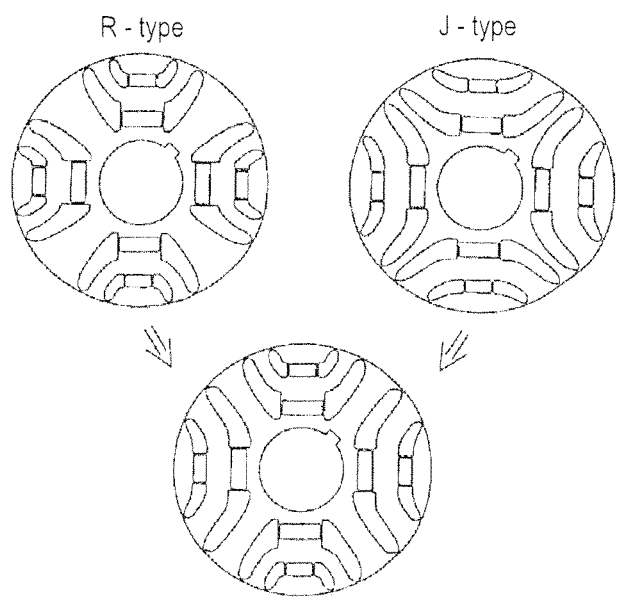
FIG. 1 shows a representation of the barrier geometry proposed according to the prior art, in which two different barrier configurations are combined to a modified geometry.
Figure 2:
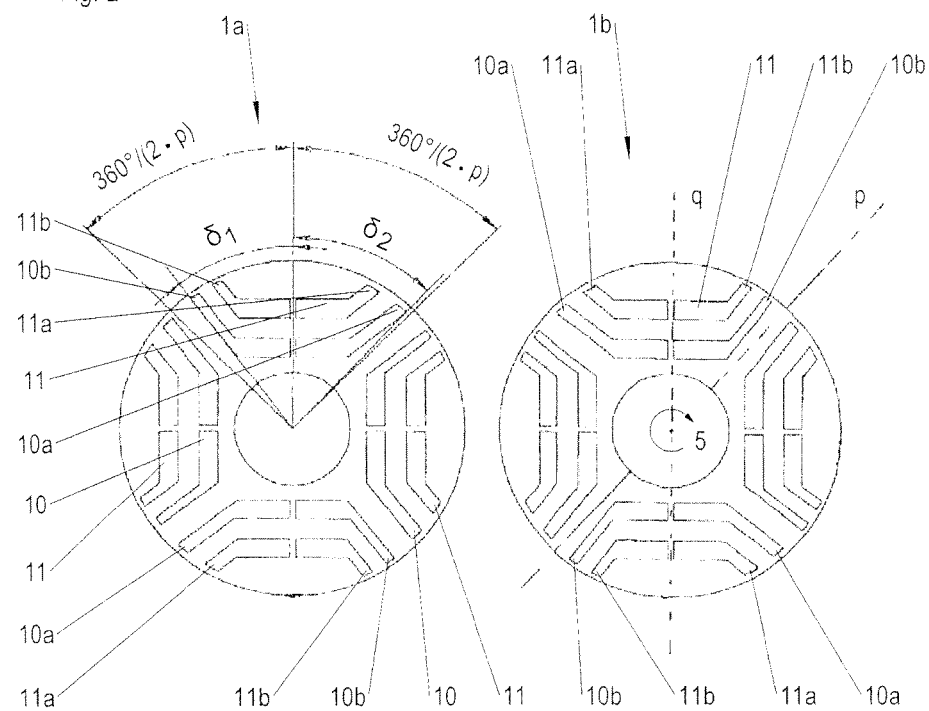
FIG. 2 shows a representation of the lamination according to the invention and of a folded lamination.

FIG. 2 shows the construction of the rotor according to the invention in cross-section, wherein two laminations 1a, 1b are shown. The rotor 1 generally is stacked to form a sheet package of a plurality of electrical sheets 1a, 1b, wherein the individual electrical sheets have the structure shown in FIG. 2. In detail, the cross-section 1a, 1b of FIG. 2 shows a four-pole rotor construction with a total of four flux blocking portions, wherein each flux blocking portion includes two magnetic flux barriers 10, 11. The four flux blocking portions are identical, i.e. the flux barriers 10, 11 of the portions are identical in design, whereby a point symmetry of the rotor cross-section with respect to the axis of rotation 5 is obtained. In particular, it can be seen that the point symmetry is point-symmetrical to each opposite magnetic pole.

The flux barriers 10, 11 themselves are designed asymmetrical, wherein the inequality of the respective magnetic flux barrier angles $\theta_{1/2}$ of a flux barrier 10, 11 and the resulting asymmetry to the q-axis can be recognized. Magnetic flux barrier angle $\theta_{1/2}$ is understood to be the angle taken by the outer ends 10a, 10b, 11a, 11b of a flux barrier 10, 11, in particular by the outer edge of the outer ends, with respect to the straight middle part of the flux barrier.

For each magnetic flux barrier 10, 11 the chosen magnetic flux angle $\theta_{1/2}$ is reduced or increased with respect to a symmetrical barrier angle $\theta_{sym}$ by a certain amount. Symmetrical barrier angle $\theta_{sym}$ is understood to be an original starting or reference angle, which usually is taken by the outer ends of a symmetrical barrier with respect to the q-axis. In the case of a symmetrical barrier, the angle would be identical for both ends and preferably would be 135°.

Proceeding from this symmetrical reference angle $\theta_{sym}$, the angle $\theta_2$ of the one barrier end 10a, 11a is increased by a specific angle amount, while the angle $\theta_1$ of the opposite end 10b, 11b is reduced by a specific angle value. The angle changes for $\theta_{1/2}$ generally are not equal in amount, although this cannot be excluded.

Figure 4:
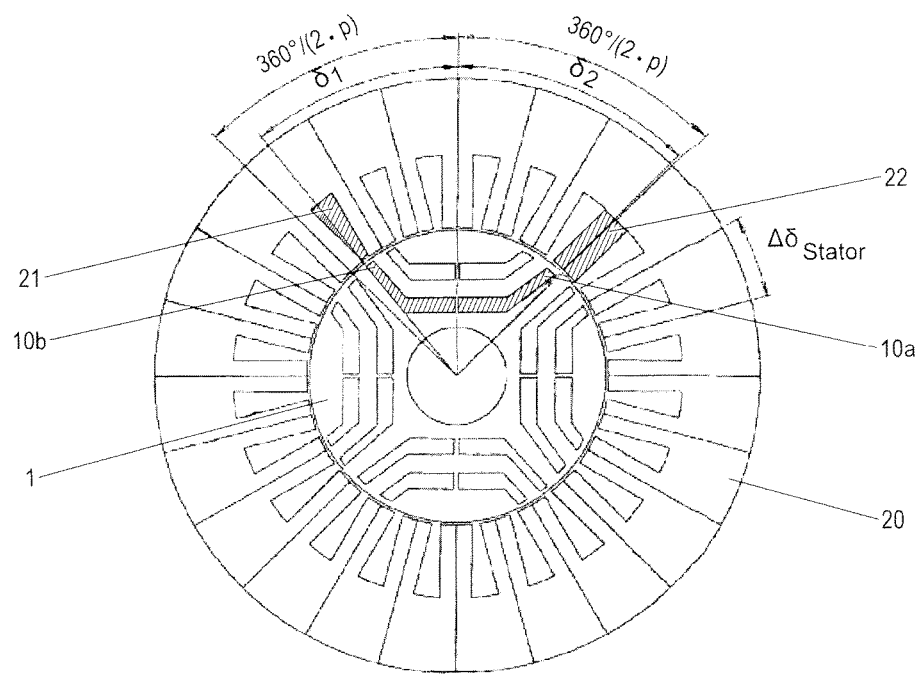
FIG. 4 shows a top view of the rotor cross-section and stator construction with the indicated angle assignment of rotor flux barriers and stator tooth.

What is important is the position of flux barrier ends 10a, 10b of the innermost barrier 10, as the same have the largest opening angle and the smallest distance to the center of the rotor axis of rotation 5. FIG. 4 shows the position of the rotor 1 with respect to the stator 20. On the stator side, the end points 10a, 10b of the innermost barrier 10 cover a groove opening 21 with the one end point 10b and a stator tooth 22 with the other end point 10a. In FIG. 4, the opening angles $\delta'_1$, $\delta'_2$ of the flux barrier 10 are indicated.

To fulfill this requirement, an admissible range must be found for the adaptation of the barrier angle changes. For this purpose, the following equations can be used:

$$\Delta\theta_{Stator} = \frac{360°}{N_{stator\ groove}} \quad (1)$$

$$\theta_{1,max} = \theta_{sym} + \Delta\theta_{Stator} \quad (2)$$

$$\theta_{2,min} = \theta_{sym} - \Delta\theta_{Stator} \quad (3)$$

$$\Delta\theta_{Stator} \geq \frac{|\theta_1 - \theta_2|}{2} \quad (4)$$

wherein the angle $\Delta\theta_{Stator}$ here represents the groove pitch of the stator 20. Thus, a maximum value $\theta_{1,max}$ is defined for the barrier angle $\theta_1$, wherein $\theta_1 < \theta_{1,max}$, and for the second barrier angle $\theta_2$ a minimum angle $\theta_{2,min}$ is defined, wherein here $\theta_2 > \theta_{2,min}$.

Hence, the angle $\theta_2$ of an originally symmetrical barrier end 10a maximally should be reduced by the angle $\Delta\theta_{Stator}$, while at the same time the angle $\theta_1$ of the opposite end 10b maximally is increased by the angle $\Delta\theta_{Stator}$.

For the chosen angle $\theta_1$, $\theta_2$ the following then applies:

$$\Delta\theta_{Stator} \geq \frac{|\theta_2 - \theta_1|}{2}$$

The representation of FIG. 4 furthermore clearly shows that the stator 20 is characterized by an arbitrary number of stator teeth 22 and stator grooves 21, wherein the distance between the individual grooves or teeth is constant over the stator circumference.

For the further reduction of the torque ripple, the occurring harmonic flux components must cancel each other out. For this purpose, the rotor 1 additionally is divided into two or more segments A, B in axial direction, as can be taken for example from FIG. 3. The individual segments A, B can be characterized by one or more laminations 1a, 1b, wherein within a segment A, B the individual sheets are identical in design and are mounted on the rotor shaft with the same orientation. The segments A, B use identical laminations, but differ in their orientation on the rotor shaft.

For example, segment A uses the laminations 1b in the illustrated orientation. When this lamination geometry is folded about the Z-axis by 180°, the lamination geometry 1a is obtained, as it is shown in FIG. 2 and also in FIG. 3. All laminations of the segments B use the orientation on the shaft according to the representation 1a.

The arrangement of the individual magnetic flux barriers 10, 11 has a point symmetry with respect to the axis of rotation 5, in contrast to the prior art. By the suitable choice of the flux barrier angles $\theta_{1/2}$, a precisely defined phase position of the torque ripple can be adjusted. In connection with a segmentation of the machine into n parts A, B, wherein n is an even number, and folding of the segment halves A, B against each other, the torque ripple can be reduced considerably. The torques of the individual segments A, B are added on the shaft and due to the superposition lead to a reduced ripple, i.e. by applying the sheet packages according to segments A, B onto the rotor shaft, the resulting overall torque is superimposed, and the ripple of the torque thereby is canceled out by the phase shift. Due to the asymmetrical design of the flux barrier angles $\theta_{1/2}$, the mean torque remains almost unchanged.

Figure 3:
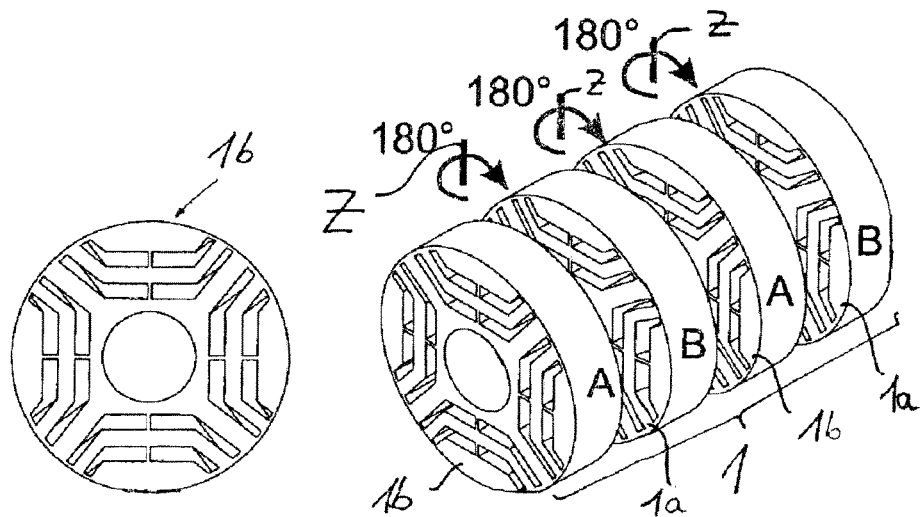
FIG. 3 shows a top view and a side view of the rotor segments according to the present invention.

FIG. 3 shows an arrangement A, B, A, B, so that respectively adjacent segments A, B are rotated by 180°. Arbitrary configurations, however, are conceivable, such as for example ABBA, ABBAABBA or BAABBAAB. The present invention, however, by no means should be limited to a concrete configuration.

The invention claimed is:

1. An aircraft with at least one synchronous reluctance machine, comprising:
   a stator with a plurality of grooves and teeth and a rotor with a plurality of magnetic flux barriers, wherein at least one magnetic flux barrier is asymmetrical to a q-axis of the rotor;
   wherein a first magnetic flux barrier of the plurality of magnetic flux barriers has a first end opposed to one of the plurality of grooves of the stator and an opposite end of a same or a second magnetic flux barrier opposed to one of the plurality of teeth of the stator; and
   wherein the first magnetic flux barrier and the second magnetic flux barrier together form a flux blocking portion;
   wherein flux barrier angles of the at least one magnetic flux barrier are defined by the following equations:

$$\Delta\theta_{Stator} = \frac{360°}{N_{stator\ groove}} \quad (1)$$

$$\theta_{1,max} = \theta_{sym} + \Delta\theta_{Stator} \quad (2)$$

$$\theta_{2,min} = \theta_{sym} - \Delta\theta_{Stator} \quad (3)$$

$$\Delta\theta_{Stator} \geq \frac{|\theta_1 - \theta_2|}{2} \quad (4)$$

wherein $\theta_{1/2}$ are unequal flux barrier angles and $\theta_{1,max}$ defines a maximum value for a first flux barrier angle, $\theta_{2,min}$ defines a minimum value for a second flux barrier angle, $\theta_{sym}$ represents a symmetrical reference angle, and $\Delta\theta_{stator}$ represents a groove pitch of the stator.

2. The aircraft of claim 1, wherein the flux barrier angles of the at least one asymmetrical magnetic flux barrier are unequal.

3. The aircraft of claim 1, wherein at least one or more of an innermost magnetic flux barrier is asymmetrical to the q-axis.

4. The aircraft of claim 1, wherein the flux barrier angles of the at least one magnetic flux barrier are chosen such that a flux barrier end approximately is located over a stator groove and an opposite flux barrier end approximately is located over a stator tooth.

5. The aircraft of claim 1, wherein an arrangement of the magnetic flux barrier of a rotor cross-section is point-symmetrical to an axis of rotation of the rotor.

6. The aircraft of claim 5, wherein the arrangement of the magnetic flux barrier of the rotor cross-section is point-symmetrical to the axis of rotation of the rotor per magnetic pole.

7. The aircraft of claim 1, wherein the rotor is divided into one or more segments in an axial direction, wherein a part of the rotor segments is mounted on a rotor shaft folded about a Z-axis.

8. The aircraft of claim 7, wherein the one or more segments is even or not even.

9. The aircraft of claim 7, wherein the one or more segments comprise one or more laminations of a rotor package.

10. The aircraft of claim 9, wherein the rotor package is constructed of identical laminations, and wherein adjacent laminations are arranged on the rotor shaft folded by 180° with respect to the Z-axis.

11. The aircraft of claim 1, wherein the stator includes a plurality of regularly spaced grooves and teeth.

12. The aircraft of claim 1, wherein the at least one synchronous reluctance machine serves as a drive for at least one electric actuator.

13. The aircraft of claim 12, wherein the drive for the at least one electric actuator is a central drive for a high-lift system.

14. The aircraft of claim 12, wherein the drive for the at least one electric actuator is an electromechanical drive of a flight control system.

15. The aircraft of claim 12, wherein the drive for the at least one electric actuator is an electromechanical drive of a landing gear actuation system.

16. The aircraft of claim 12, wherein the drive for the at least one electric actuator is an electromechanical drive of a steering system.

17. An aircraft with at least one synchronous reluctance machine, comprising:
a stator with a plurality of grooves and teeth and a rotor with a plurality of magnetic flux barriers, further comprising flux barrier angles, wherein at least one magnetic flux barrier is asymmetrical to a q-axis,
wherein at least one or more of an innermost magnetic flux barrier is asymmetrical to the q-axis,
wherein the flux barrier angles of the at least one magnetic flux barrier are such that a flux barrier end is located over a stator groove and an opposite flux barrier end is located over a stator tooth; and
wherein a first end of the at least one magnetic flux barrier is thinner than a section of the at least one magnetic flux barrier proximate to a midpoint of the rotor;
wherein the flux barrier angles of the at least one magnetic flux barrier are defined by the following equations:

$$\Delta\theta_{Stator} = \frac{360°}{N_{stator\ groove}} \quad (1)$$

$$\theta_{1,max} = \theta_{sym} + \Delta\theta_{Stator} \quad (2)$$

$$\theta_{2,min} = \theta_{sym} - \Delta\theta_{Stator} \quad (3)$$

$$\Delta\theta_{Stator} \geq \frac{|\theta_1 - \theta_2|}{2} \quad (4)$$

wherein $\theta_{1/2}$ are unequal flux barrier angles and $\theta_{1,max}$ defines a maximum value for a first flux barrier angle, $\theta_{2,min}$ defines a minimum value for a second flux barrier angle, $\theta_{sym}$ represents a symmetrical reference angle, and $\Delta\theta_{stator}$ represents a groove pitch of the stator.

* * * * *